(12) United States Patent
Cuesta Castro (10) Patent No.: US 12,145,720 B2
(45) Date of Patent: Nov. 19, 2024

(54) METHOD OF OPERATING AN AIRCRAFT DURING BRAKING AND NON-BRAKING PERIODS

(71) Applicant: AIRBUS OPERATIONS LIMITED, Bristol (GB)

(72) Inventor: Carlos Cuesta Castro, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 504 days.

(21) Appl. No.: 17/426,555

(22) PCT Filed: May 28, 2020

(86) PCT No.: PCT/EP2020/064793
§ 371 (c)(1),
(2) Date: Jul. 28, 2021

(87) PCT Pub. No.: WO2020/239886
PCT Pub. Date: Dec. 3, 2020

(65) Prior Publication Data
US 2022/0177119 A1    Jun. 9, 2022

(30) Foreign Application Priority Data
May 30, 2019    (GB) ..................................... 1907645

(51) Int. Cl.
*B64C 25/32*    (2006.01)
*B60T 8/17*    (2006.01)

(52) U.S. Cl.
CPC .......... *B64C 25/405* (2013.01); *B60T 8/1703* (2013.01)

(58) Field of Classification Search
CPC ........ B64C 25/405; B64C 25/42; B64C 25/44
See application file for complete search history.

(56) References Cited

U.S. PATENT DOCUMENTS 3,874,619 A * 4/1975 Collins ................. B64C 25/405
244/50
2015/0210383 A1    7/2015 De Mers et al.
(Continued)

FOREIGN PATENT DOCUMENTS

EP    2 666 717    11/2013
EP    3 095 693    11/2016
(Continued)

OTHER PUBLICATIONS

International Search Report for PCT/EP2020/064793, mailed Sep. 2, 2020, 4 pages.
(Continued)

*Primary Examiner* — Joshua J Michener
*Assistant Examiner* — Arfan Y. Sinaki
(74) *Attorney, Agent, or Firm* — Nixon & Vanderhye P.C.

(57) ABSTRACT

A method of operating an aircraft is disclosed including, during a non-braking time period, taxiing the aircraft by using driving torque provided by a landing gear drive system, and not providing a braking torque from the landing gear brake system, and, during a braking time period, providing the brake command device at one or more command levels within a sub-range of a brake command range, and controlling the landing gear drive system, in response to the level of the brake command device, to reduce the driving torque provided.

20 Claims, 2 Drawing Sheets

(56) References Cited

U.S. PATENT DOCUMENTS

| | | | |
|---|---|---|---|
| 2015/0375854 A1 | 12/2015 | Abel et al. | |
| 2016/0124428 A1* | 5/2016 | Nutaro | B64D 41/00 |
| | | | 701/2 |
| 2016/0200428 A1* | 7/2016 | Morris | B64C 25/405 |
| | | | 244/50 |
| 2016/0318604 A1* | 11/2016 | Guery | B64C 25/50 |

FOREIGN PATENT DOCUMENTS

| | | |
|---|---|---|
| EP | 3 312 085 | 4/2018 |
| WO | 2014/023941 | 2/2014 |
| WO | 2015/025131 | 2/2015 |

OTHER PUBLICATIONS

Written Opinion of the ISA for PCT/EP2020/064793, mailed Sep. 2, 2020, 8 pages.
Combined Search and Examination Report for GB1907645.4, dated Nov. 14, 2019, 5 pages.

* cited by examiner

METHOD OF OPERATING AN AIRCRAFT DURING BRAKING AND NON-BRAKING PERIODS

CROSS REFERENCE TO RELATED APPLICATIONS

The present application is a National Phase of International Application Number PCT/EP2020/064793 filed May 28, 2020, which designated the U.S. and claims priority benefits from Great Britain Application Number GB 1907645.4 filed May 30, 2019, the entire contents of each of which are hereby incorporated by reference.

BACKGROUND OF THE INVENTION

The present disclosure relates to methods of operating aircraft.

The present invention concerns a method of operating an aircraft, the aircraft having a landing gear drive system for providing driving torque during taxiing, a landing gear brake system for providing braking torque during taxiing, and a brake command device with a plurality of different command levels over a brake command range.

More particularly, but not exclusively, this invention concerns a method comprising the steps of, during a non-braking time period, taxiing the aircraft by using driving torque provided by the landing gear drive system, and not providing a braking torque from the landing gear brake system and, during a braking time period, providing the brake command device at one or more command levels within a sub-range of the brake command range.

The invention also concerns an aircraft controller, a landing gear drive and brake system, a landing gear drive system and a method of driving a wheel of a landing gear of an aircraft during taxiing.

Conventional passenger aircraft use their engines to provide power for taxiing in a forwards direction at an airport. The engines are run at an idle (low) setting and aircraft brakes are used to decrease the speed to a suitable taxiing speed. If the aircraft is to be moved backwards, a tug or similar is used.

Various e-taxi systems have been described and proposed (for example, in WO2014/023941) where a landing gear drive system (comprising a motor, a drive gear connected to the motor, and a driven gear that can be driven by the drive gear and being connected to the wheel) is used to drive one or more wheels of a landing gear of an aircraft in a forwards or backwards direction. When taxiing using such an e-taxi system, it is proposed that the engines are turned off and the aircraft is driven using the e-taxi drive system only. The driving torque applied by the drive system is proportional to a cockpit command. When a pilot wishes to reduce the speed of the taxiing aircraft, they apply the aircraft brake. This would cause the e-taxi system to disengage (the drive gear and driven gear to be disconnected) so that the e-taxi motor is not caused to experience excessive heating and so that the loads on the wheel rims are reduced, during braking.

However, it is believed that this method may cause issues. In particular, it is considered that the handling qualities of the aircraft would be unsatisfactory, as the decrease of speed may not be smooth or predictable enough, due to the discontinuity when the e-taxi drive system is suddenly disconnected. For example, smooth control and speed predictability are required especially given the need to park the aircraft at a specific and precise location when approaching an airport gate or when the aircraft is taxiing in a queue behind other aircraft. It is also believed that stopping the aircraft during pushback would require smoother handling that what would be achieved with the proposed method. This is at least partly due to the fact that the brakes of the aircraft would be relatively cold when pushback is required and so may be especially jerky. In practice, this may mean that the aircraft has to be taxied at a lower speed than that of a conventional aircraft, if this precision maneuvering is required. This would increase the turnaround time of the aircraft and could cause traffic issues at the airport. In addition, this would also require the pilot to control the aircraft using two control systems; that of the e-taxi drive system and the brake system.

The present invention seeks to mitigate the above-mentioned problems. Alternatively or additionally, the present invention seeks to provide an improved method of operating an aircraft and/or an improved aircraft controller.

SUMMARY OF THE INVENTION

The present invention provides, according to a first aspect, a method of operating an aircraft, the aircraft having a landing gear drive system for providing driving torque during taxiing, a landing gear brake system for providing braking torque during taxiing, and a brake command device with a plurality of different command levels over a brake command range, the method comprising the steps of, i) during a non-braking time period, taxiing the aircraft by using driving torque provided by the landing gear drive system, and not providing a braking torque from the landing gear brake system, ii) during a braking time period, providing the brake command device at one or more command levels within a sub-range of the brake command range, and controlling the landing gear drive system, in response to the level of the brake command device, to reduce the driving torque provided from that in step i).

In other words, the method involves a step ii) where the driving torque is reduced from the previous (non-braking) level, but still is more than zero. This may provide a "transition" step where, before braking torque is applied, the driving torque is reduced. This may additionally or alternatively provide a "combination" step where, braking torque is applied and the driving torque is reduced. This allows the aircraft to have a smoother and more predictable speed control and so enable effective parking, queuing (and pushback) etc. at the same speed as that used for conventional aircraft. This can also be achieved using only the brake command device. There is no need to disengage or turn off the e-taxi system prior to changing the level of the brake command device. The driving torque applied is reduced only in response to the braking command provided by the brake command device. This method also allows the aircraft to be controlled using the same techniques (i.e. just using the brake command device) as for a conventional aircraft that is taxied with the engines.

By providing a method where the drive system and brake system are somewhat integrated (i.e. they both are able to be working at the same time), the inventor has realised that good handling qualities can be achieved.

The landing gear drive system may be provided in a main landing gear or a nose landing gear, but preferably a main landing gear.

Preferably, a magnitude of reduction of the driving torque increases as the command level within the sub-range increases. In other words, the magnitude of driving torque provided decreases as the command level within the sub-range increases. For example, as there is more brake command from the brake command device (a pilot pressing harder on a brake pedal, for example), the less driving torque is applied.

The magnitude of reduction of the driving torque may increase linearly as the command level within the sub-range increases.

Preferably, in step i), there is either zero command level from the brake command device or a very low command level from the brake command device. In other words, step i) occurs where there is either no brake command or only a very low brake command (a pilot pressing very lightly or not at all on a brake pedal, for example). For example, the brake command may be up to 15% of the total brake command possible. For example, the pilot may apply pressure to have a deflection of the brake pedal up to a 15% of the maximum deflection of the brake pedal. In step i), the brake command may be up to between 10 and 20% of the total brake command possible.

Preferably, step ii) occurs during a "transition" braking time period and wherein the brake command device is provided at one or more command levels within a "transition" sub-range of the brake command range. In this "transition" step, the driving torque is reduced to achieve a speed reduction of the aircraft but braking torque is not applied. This helps to "transition" from a pure driving mode to a mode where braking torque is applied. This also increases the effective range of the brake command device. This also ensures that the magnitude of driving torque that is combined with a braking torque (that is later applied) is limited to that below the maximum driving torque magnitude.

More preferably, the "transition" sub-range represents command levels at a low command level from the brake command device. In other words, step ii) occurs where there is a low brake command (a pilot pressing relatively lightly on a brake pedal, for example). For example, the brake command may be between 15% and 22% of the total brake command possible. For example, the pilot may apply pressure to have a deflection of the brake pedal of 17% of the maximum deflection of the brake pedal. In step ii), the brake command may be between 10 and 30% of the total brake command possible.

Alternatively, step ii) occurs during a "combination" braking time period and wherein the brake command device is provided at one or more command levels within a "combination" sub-range of the brake command range, and wherein step ii) comprises controlling the landing gear brake system, in response to the level of the brake command device, to provide a braking torque from the landing gear brake system. In this "combination" step, the driving torque is reduced to achieve a speed reduction of the aircraft and braking torque is also applied to further reduce the aircraft speed. This helps to provide an effective braking mode.

Preferably, the "combination" sub-range represents command levels at a medium command level from the brake command device. In other words, step ii) occurs where there is a medium brake command (a pilot pressing with reasonable pressure on a brake pedal, for example). For example, the brake command may be between 22% and 35% of the total brake command possible. For example, the pilot may apply pressure to have a deflection of the brake pedal of 29% of the maximum deflection of the brake pedal. In step ii), the brake command may be between 20 and 45% of the total brake command possible.

Preferably, the braking torque and driving torque are applied to the same wheel of the landing gear.

Preferably, a magnitude of braking torque provided increases as the command level within the sub-range increases. In other words, the magnitude of braking torque provided increases as the command level within the sub-range increases. For example, as there is more brake command from the brake command device (a pilot pressing harder on a brake pedal, for example), the more braking torque is applied.

The magnitude of braking torque may increase linearly as the command level within the sub-range increases.

Preferably, the method comprises the steps of step i) during a non-braking time period, then step ii) during a "transition" braking time period, and then step ii) during a "combination" braking time period.

In other words, the method involves at least three stages; a first non-braking stage where there is no change to the driving torque applied and no braking torque applied, a second stage where the driving torque is reduced but no braking torque is applied and a third stage where the driving torque is (further) reduced and braking toque is applied.

Preferably, the method concludes with the step of during a non-driving time period braking the aircraft by using braking torque provided by the landing gear brake system, and not providing a driving torque from the landing gear drive system. This would be a fourth stage if combined with the three stages of the previous paragraph.

Preferably, the "non-driving" sub-range represents command levels at a high command level from the brake command device. In other words, it occurs where there is a high brake command (a pilot pressing with high pressure on a brake pedal, for example). For example, the brake command may be above 35% of the total brake command possible. For example, the pilot may apply pressure to have a deflection of the brake pedal of 45% of the maximum deflection of the brake pedal. In this step, the brake command may be between 25% and 100% of the total brake command possible.

This "non-driving" sub-range may occur where the brake command is equivalent to more than 30 or 40 bars of brake pressure.

The taxiing of the aircraft may be in a forwards or a backwards direction.

The brake command device may be a brake pedal, or other cockpit control. The command level may be determined by the amount of deflection of or the amount of pressure/force applied to the brake pedal/control.

According to a second aspect of the invention there is also provided an aircraft controller for controlling an aircraft during taxiing, the aircraft controller comprising a brake command device input indicating a command level of a brake command device over a brake command range, a drive command device input indicating a command level of a drive command device, and a landing gear drive system command output providing a command for a landing gear drive system, wherein the controller is configured so that i) when the brake command device input indicates a command level in a first sub-range of the brake command range, the landing gear drive system command output provides a command for the landing gear drive system to provide a driving torque to taxi the aircraft, and ii) when the brake command device input indicates a command level in a second sub-range of the brake command range, the landing gear drive system command output provides a command for the landing gear drive system to provide a reduced driving torque than that in i).

Preferably, the controller is configured so that the reduction command of the driving torque increases as the command level within the sub-range increases. In other words, the magnitude of driving torque provided decreases as the command level within the sub-range increases. For example, as there is more brake command from the brake command device (a pilot pressing harder on a brake pedal, for example), the less driving torque is applied.

The controller may be configured so that the reduction command of the driving torque increases linearly as the command level within the sub-range increases.

Preferably, the first sub-range of the brake command range represents command levels at a zero or very low command level from the brake command device. The first sub-range may correspond to a non-braking step. There may be either zero command level from the brake command device or a very low command level from the brake command device. In other words, this occurs where there is either no brake command or only a very low brake command (a pilot pressing very lightly or not at all on a brake pedal, for example). For example, the brake command may be up to 15% of the total brake command possible. For example, the pilot may apply pressure to have a deflection of the brake pedal up to a 15% of the maximum deflection of the brake pedal. The brake command may be up to between 10 and 20% of the total brake command possible.

Preferably, the second sub-range of the brake command range represents command levels at a low command level from the brake command device. The second sub-range may correspond to a "transition" step. There may be command levels at a low command level from the brake command device. In other words, this occurs where there is a low brake command (a pilot pressing relatively lightly on a brake pedal, for example). For example, the brake command may be between 15% and 22% of the total brake command possible. For example, the pilot may apply pressure to have a deflection of the brake pedal of 17% of the maximum deflection of the brake pedal. The brake command may be between 10 and 30% of the total brake command possible.

Preferably, the controller comprises a landing gear brake control system and wherein the landing gear brake control system comprises a landing gear brake system command output providing a command for a landing gear brake system, the landing gear brake control system being configured so that i) when the brake command device input indicates a command level in the first sub-range of the brake command range, the landing gear brake system command output provides a command to the landing gear brake system to not provide a braking torque, and ii) when the brake command device input indicates a command level in the second sub-range of the brake command range, the landing gear brake system command output provides a command to the landing gear brake system to provide a braking torque.

More preferably, the landing gear brake control system is configured so that the command of the braking torque increases as the command level within the sub-range increases. In other words, the magnitude of braking torque provided increases as the command level within the sub-range increases. For example, as there is more brake command from the brake command device (a pilot pressing harder on a brake pedal, for example), the more braking torque is applied.

The landing gear brake control system may be configured so that the command of the magnitude of braking torque may increase linearly as the command level within the sub-range increases.

The second sub-range of the brake command range may represent command levels at a medium command level from the brake command device. The second sub-range may correspond to a "combination" step. There may be command levels at a medium command level from the brake command device. In other words, this occurs where there is a medium brake command (a pilot pressing with reasonable pressure on a brake pedal, for example). For example, the brake command may be between 22% and 35% of the total brake command possible. For example, the pilot may apply pressure to have a deflection of the brake pedal of 29% of the maximum deflection of the brake pedal. The brake command may be between 20 and 45% of the total brake command possible.

Preferably, the braking torque and driving torque are applied to the same wheel of the landing gear.

Preferably, the controller is configured so that when the brake command device input indicates a command level in a low sub-range of the brake command range, the landing gear drive system command output provides a command for the landing gear drive system to provide a reduced driving torque than that in i), and so that when the brake command device input indicates a command level in a medium sub-range of the brake command range, the landing gear drive system command output provides a command for the landing gear drive system to provide a reduced driving torque than that in i), and the landing gear brake system command output of the landing gear brake control system provides a command to the landing gear brake system to provide a braking torque.

In other words, the controller is configured to control at least three stages; a first non-braking stage where there is no change to the driving torque applied and no braking torque applied, a second stage where the driving torque is reduced but no braking torque is applied and a third stage where the driving torque is (further) reduced and braking toque is applied.

Preferably, the controller is configured so that when the brake command device input indicates a command level in a further sub-range of the brake command range the landing gear drive system command output provides a command for the landing gear drive system to not provide a driving torque to taxi the aircraft, and the landing gear brake system command output provides a command to the landing gear brake system to provide a braking torque. This would be a fourth stage if combined with the three stages of the previous paragraph.

Preferably, the further sub-range represents command levels at a high command level from the brake command device. The further sub-range may correspond to a "non-driving" step. There may be command levels at a high command level from the brake command device. In other words, it occurs where there is a high brake command (a pilot pressing with high pressure on a brake pedal, for example). For example, the brake command may be above 35% of the total brake command possible. For example, the pilot may apply pressure to have a deflection of the brake pedal of 45% of the maximum deflection of the brake pedal. In this step, the brake command may be between 25% and 100% of the total brake command possible.

The taxiing of the aircraft may be in a forwards or a backwards direction.

According to a third aspect of the invention there is also provided a landing gear drive and brake system comprising the aircraft controller as described above.

According to a fourth aspect of the invention there is also provided a landing gear drive system comprising a motor for providing a motor torque, a drive gear in drive connection with the motor, for providing a driving torque to a landing gear wheel, a controller for controlling the level of motor torque provided by the motor, the controller comprising a control input for providing an indication of the desired driving torque, and a reduction factor input for providing an indication of a reduction factor to be applied to the desired driving torque, wherein the controller is configured to control the level of motor torque based on the control input and the reduction factor input.

Preferably, the desired driving torque is the level of driving torque desired if there is no brake effect to be applied.

Preferably, the reduction factor is the level of reduction to be applied to take account of a brake effect to be applied.

More preferably, the brake effect may be only as a result of the reduction factor or may be a combination of the reduction factor and a braking torque applied to a landing gear wheel.

Even more preferably, the braking torque is applied to the same wheel of the landing gear as the driving torque.

Preferably, the reduction factor may be such that the level of motor torque is zero.

The taxiing of the aircraft may be in a forwards or a backwards direction.

According to a fifth aspect of the invention there is also provided a method of driving a wheel of a landing gear of an aircraft during taxiing, the method including a control unit controlling the amount of driving torque supplied to the wheel while braking is applied to the wheel or another wheel of the same landing gear in response to a received braking demand, and the control unit progressively reducing the driving torque supplied to the wheel in response to successive increases in the braking demand.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
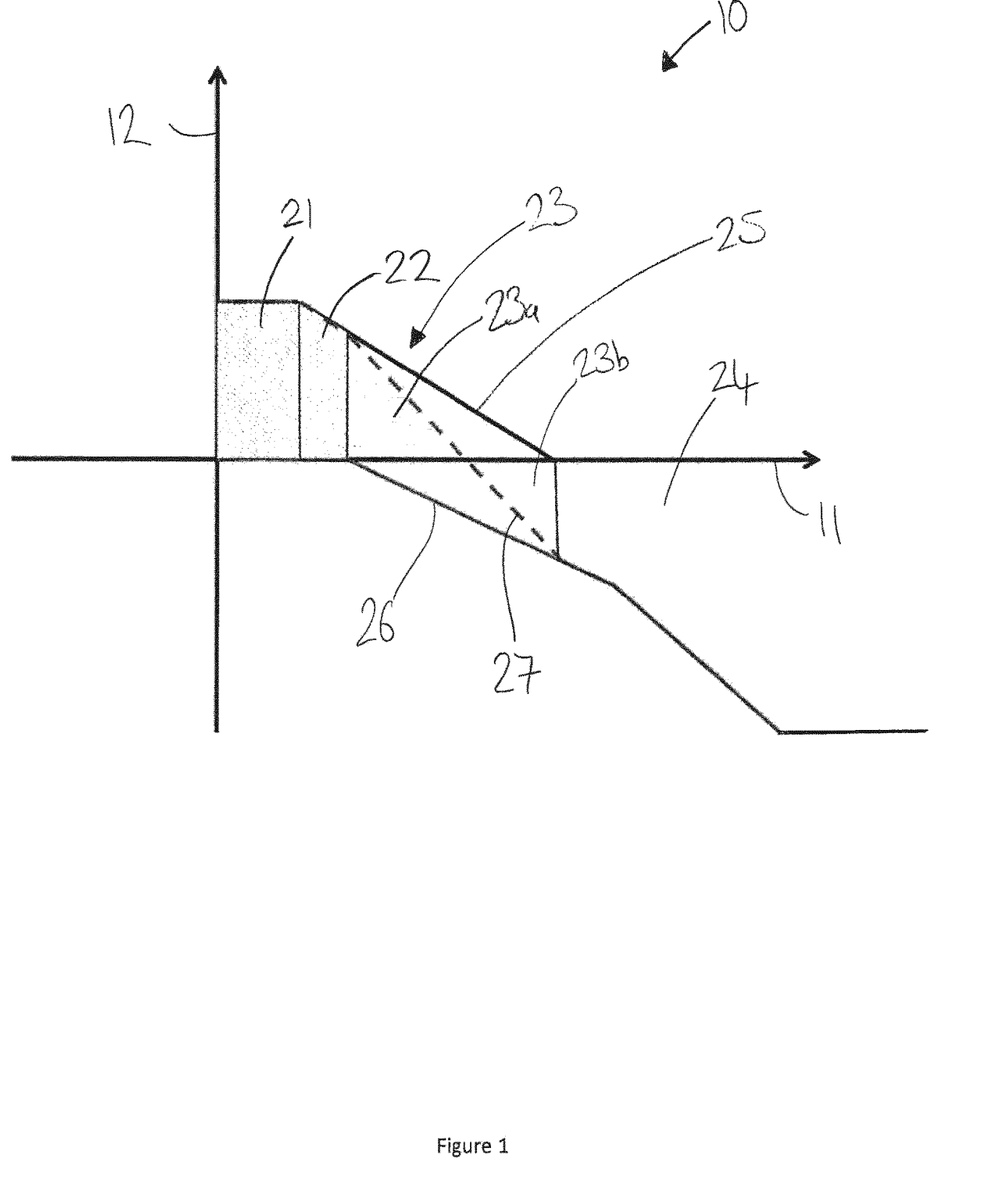
FIG. 1 shows a graph illustrating the method of operating an aircraft according to a first embodiment of the invention.

FIG. 1 shows a graph 10 illustrating a method of operating an aircraft according to a first embodiment of the invention.

The graph has an x axis 11 representing the deflection of a brake pedal in a cockpit of the aircraft being operated by the method. The graph has a y axis 12 representing the torque applied to the landing gear of the aircraft being operated.

The graph shows the e-taxi drive system torque (driving torque) being applied to the landing gear by line 25. This line 25 is entirely above the x axis 11 to show that the driving torque is considered to be in a positive direction. The graph shows the brake system torque (braking/resistive torque) being applied to the landing gear by line 26. This line 26 is entirely below the x axis 11 to show that the braking torque is considered to be in a negative direction. Finally, the graph also shows the total torque (a combination of the positive driving torque and negative braking torque) acting on the landing gear by dashed line 27. This dashed line 27 extends both above and below the x axis 11, as the overall torque acting on the landing gear is both positive and negative during different periods of the method.

The graph can be considered to be divided into a number of areas or sections.

A first "driving area" 21 is the mode (i.e. the method is operating in a "driving mode") being operated when there is zero or a very low brake pedal deflection. In this embodiment, the "driving mode" is in operation when the brake pedal deflection is between 0% and 15% of the total brake pedal deflection possible. In this "driving mode", the driving torque 25 provided is at a set level, as commanded by a cockpit command. This is, for example, a dial in the cockpit to indicate the amount of torque to be provided by the e-taxi drive system in the absence of any brake command Here, this cockpit command is at the maximum e-taxi torque level of 8,000 Nm per wheel (applied to wheels 2 and 3 of the landing gear).

No braking torque 26 is applied by the braking system in this mode, so the total torque 27 is the same as the driving torque 25.

A second "transition area" 22 is the mode (i.e. the method is operating in a "transition mode") being operated when there is a low brake pedal deflection. In this embodiment, the "transition mode" is in operation when the brake pedal deflection is between 15% and 22% of the total brake pedal deflection possible. In this "transition mode", the driving torque 25 provided is reduced from the previous set level of 8,000 Nm per wheel. It can be seen that the driving torque 25 reduces linearly as the brake pedal deflection 11 increases within the range of 15% to 22%. In other words, the reduction of driving torque between 15% and 17% brake pedal deflection is the same as from 17% to 19%, for example.

No braking torque 26 is applied by the braking system in this mode, so the total torque 27 is the same as the driving torque 25.

A third "combination area" 23 is the mode (i.e. the method is operating in a "combination mode") being operated when there is a medium brake pedal deflection. In this embodiment, the "combination mode" is in operation when the brake pedal deflection is between 22% and 35% of the total brake pedal deflection possible. In this "combination mode", the driving torque 25 provided is reduced from the previous set level of 8,000 Nm per wheel. It can be seen that the driving torque 25 continues to reduce linearly as the brake pedal deflection 11 increases within the range of 22% to 35%. In other words, the reduction of driving torque between 22% and 24% brake pedal deflection is the same as from 24% to 26%, for example. In fact, as the driving torque 25 also reduces at the same linear rate in the "transition mode" 22, the reduction is driving torque between 15% and 22% is the same as the reduction as between 22% and 29%. At 35% brake pedal deflection the driving torque 26 has reduced to zero.

Braking torque 26 is also applied by the braking system in this mode. In particular, the braking torque applied (in the negative direction) increases linearly as the brake pedal deflection 11 increases within the range of 22% to 35%. In other words, the braking torque increase between 22% and 24% brake pedal deflection is the same as from 24% to 26%, for example.

The total torque 27 in this "combination area" is positive in a first region 23a of the area, where the driving torque 25 is larger in magnitude than the braking torque 26. The total torque 27 in this "combination area" is negative in a second region 23b of the area, where the braking torque 26 is larger in magnitude than the driving torque 25.

A fourth "non-driving area" 24 is the mode (i.e. the method is operating in a "non-driving mode") being operated when there is a high brake pedal deflection. In this embodiment, the "non-driving mode" is in operation when the brake pedal deflection is above 35% of the total brake pedal deflection possible. This is equivalent to 35 bars or more of brake pressure. In this "non-driving mode", the driving torque 25 provided is zero.

Braking torque 26 is applied by the braking system in this mode. In particular, the braking torque applied (in the negative direction) increases as the brake pedal deflection 11 increases. This increase in braking torque is at the same linear rate as for the "combination mode" up to 60% brake pedal deflection and then the linear rate increases, so a higher braking torque is applied per % of further brake deflection above 60% brake deflection.

The braking torque 26 reaches a maximum (negative) level of 70,000 Nm per wheel (applied to wheels 1, 2, 3 and 4 of the landing gear) at 95% (nearly full) brake pedal deflection. The total torque 27 in this "non-driving area" is the same as the braking torque 26, as there is no driving torque 25 applied by the driving system in this mode.

Figure 2:
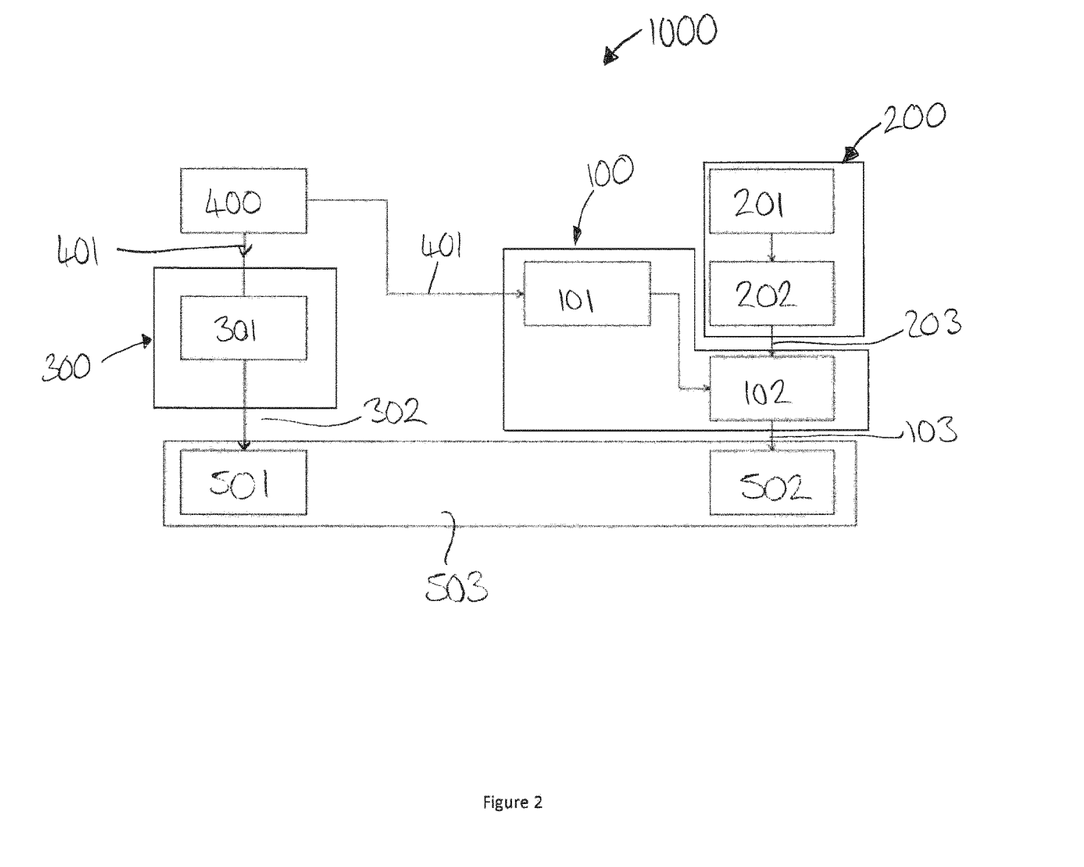
FIG. 2 shows a schematic diagram of an aircraft controller, and other control systems, according to a second embodiment of the invention, the aircraft controller being used to achieve the method of the first embodiment.

FIG. 2 shows a schematic diagram 1000 of an aircraft controller 100, and other control systems 200, 300, according to a second embodiment of the invention, the aircraft controller 100 being used to achieve the method of the first embodiment, in relation to a right hand landing gear of an aircraft.

The diagram 1000 shows a right hand (RH) brake pedal and associated sensor 400. The sensor 400 outputs (as 401) an indication of the RH brake pedal deflection (or brake pedal torque) applied by the pilot in the cockpit. Of course, this indication is also an indication of the target brake pressure desired by the pilot (for example a 25% deflection of the brake pedal may correspond to a 30 bar target brake pressure). This indication 401 is output to both the aircraft controller 100 (see later) and to a RH brake control system 300.

The RH brake control system 300 calculates (and close loop command) the RH desired brake pressure, illustrated by box 301. This is done by assessing the level of brake pedal deflection. This RH desired brake pressure is then output (as 302) to the RH brake system 501, which applies this brake pressure and achieves a resultant braking torque corresponding to line 26 in FIG. 1. The brake pressure is applied to all four wheels of the landing gear (wheels 1 to 4).

The diagram 1000 also shows a drive control system 200. This system 200 comprises a cockpit drive control 201 that the pilot controls to indicate a level of taxi torque required. This may be a simple on/off switch but here, it includes a number of different torque levels, corresponding to a different desired aircraft taxi speed. This torque command level of the control 201 is output to box 202, which calculates the RH taxi torque required, based on the level of 201. This RH taxi torque is output (as 203) to the aircraft controller 100. The system 200 also calculates the LH taxi torque required (likely to be the same or very similar to the RH taxi torque required), based on the level of 201. This LH taxi torque is output (not shown) to the aircraft controller 100, which is also associated with the LH landing gear, or another aircraft controller that is associated with the LH landing gear.

The aircraft controller 100 uses the indication of the RH brake pedal deflection 401 to estimate the expected RH brake torque assessing the level of brake pedal deflection and calculate (in box 101) the appropriate reduction factor, if there is one, (as per FIG. 1) to apply to the driving torque to be supplied to the RH drive system. This is output to box 102. Box 102 then applies this reduction factor, if there is one, to the RH taxi torque 203 commanded from the cockpit drive control 201. This gives an actual RH taxi torque to be applied by a motor of the drive system, and this is output (as 103) from the aircraft controller 100 to the RH taxi drive system 502, which applies this driving torque to the motor and achieves a resultant driving torque corresponding to line 25 in FIG. 1. The brake pressure is applied to two of the four wheels of the landing gear (wheels 2 and 3).

Box 503 illustrates the total torque applied to the RH landing gear (from 501 and 502) and corresponds to line 27 in FIG. 1.

Importantly, it can be seen that the brake control system 300 is not changed in any way by using the aircraft controller 100. Instead, an output 401 of the indication of the RH brake pedal deflection is simply outputted to the aircraft controller 100, as well as the brake control system 300.

An aircraft controller may be defined as comprising the aircraft controller 100 plus any elements of the brake control system 300 and/or drive control system 200.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

In the second embodiment described above, the output of the indication of the RH brake pedal deflection 401 is output from the RH brake pedal into the aircraft controller 100. Instead, this output (or a similar one also providing estimation of the brake torque) may be outputted from the brake control system 300 rather than directly from the brake pedal 400.

The second embodiment described above is shown in relation to a right hand main landing gear. Of course, it equally relates to a left hand (LH) landing gear.

The driving torque and braking torque in the above examples are applied to the wheels 2 and 3 and wheels 1 to 4 of the landing gear, respectively. Of course, it is also possible to for the braking and driving torque to be applied to different wheels of the same landing gear. For example, the braking torque could be applied to wheels 1 and 2 of the landing gear and the braking torque could be applied to wheels 3 and 4 of the landing gear.

The above examples provide specific values for the maximum driving torque, maximum braking torque, percentage of brake pedal deflection etc. Of course, these values may be different in other embodiments of the invention. For example, the braking torque 26 may reach a maximum (negative) level at 100% (full) brake pedal deflection.

In the above examples, a brake pedal is used to command a braking from the pilot. Of course, any other suitable brake command device, such as a lever, may be used.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

It should be noted that throughout this specification, "or" should be interpreted as "and/or".

The invention claimed is:

1. A method of operating an aircraft, the aircraft having:
 a) a landing gear drive system for providing driving torque during taxiing,
 b) a landing gear brake system for providing braking torque during taxiing, and
 c) a brake command device with a plurality of different command levels over a brake command range,
 the method comprising the steps of:
 i) during a non-braking time period;
  taxiing the aircraft by using driving torque provided by the landing gear drive system, and
  not providing a braking torque from the landing gear brake system,
 ii) during a braking time period;
  providing the brake command device at one or more command levels within a sub-range of the brake command range, and
  controlling the landing gear drive system, in response to the level of the brake command device, to reduce the driving torque provided from that in step i) to a lower yet still positive driving torque.

2. The method of operating an aircraft as claimed in claim 1, wherein a magnitude of reduction of the driving torque increases as the command level within the sub-range increases.

3. The method of operating an aircraft as claimed in claim 1, wherein in step i) during the non-braking time period, there is either zero command level from the brake command device or a very low command level from the brake command device.

4. The method of operating an aircraft as claimed in claim 1, wherein the braking time period of step ii) occurs during a transition braking time period, and wherein the brake command device is provided at one or more command levels within a transition sub-range of the brake command range.

5. The method of operating an aircraft as claimed in claim 4, wherein the "transition" sub-range represents command levels at a low command level from the brake command device.

6. The method of operating an aircraft as claimed in claim 1, wherein the braking time period in step ii) in which a reduction in driving torque applied by the braking system occurs during a combination braking time period,
 wherein the brake command device is provided at one or more command levels within a combination sub-range of the brake command range, and
 wherein the braking time period of step ii) in which a reduction in driving torque applied by the braking system comprises controlling the landing gear brake system, in response to the level of the brake command device, to provide a braking torque from the landing gear brake system.

7. The method of operating an aircraft as claimed in claim 6, wherein the combination sub-range represents command levels at a medium command level from the brake command device.

8. The method of operating an aircraft as claimed in claim 6, wherein the braking torque is applied to a wheel of the landing gear and the driving torque is applied to the wheel, being the same wheel, of the landing gear.

9. The method of operating an aircraft as claimed in claim 6, wherein a magnitude of braking torque provided increases as the command level within the sub-range increases.

10. The method of operating the aircraft as claimed in claim 1, wherein the braking time period of step ii) in which a reduction in driving torque applied by the braking system occurs during a transition braking time period and wherein the brake command device is provided at one or more command levels within a transition sub-range of the brake command range, and wherein the braking time period of step ii) in which a reduction in driving torque and braking torque applied by the braking system occurs during a combination braking time period,
 wherein the brake command device is provided at one or more command levels within a combination sub-range of the brake command range, and
 wherein step ii) during a braking time period in which a reduction in driving torque applied by the braking system comprises controlling the landing gear brake system, in response to the level of the brake command device, to provide a braking torque from the landing gear brake system.

11. An aircraft controller for controlling an aircraft during taxiing, the aircraft controller comprising:
 a) a brake command device input indicating a command level of a brake command device over a brake command range,
 b) a drive command device input indicating a command level of a drive command device, and
 c) a landing gear drive system command output providing a command for a landing gear drive system,
 wherein the controller is configured so that:
 i) when the brake command device input indicates a command level in a first sub-range of the brake command range, the landing gear drive system command output provides a command for the landing gear drive system to provide a driving torque to taxi the aircraft, and
 ii) when the brake command device input indicates a command level in a second sub-range of the brake command range, the landing gear drive system command output provides a reduction command for the landing gear drive system to provide a reduced driving torque than the driving torque to taxi the aircraft when the brake command device input indicates the command level in the first sub-range of the brake command range.

12. The aircraft controller as claimed in claim 11, wherein the controller is configured so that the reduction command of the driving torque increases as the command level within the sub-range increases.

13. The aircraft controller as claimed in claim 11, wherein the controller comprises a landing gear brake control system and wherein the landing gear brake control system comprises a landing gear brake system command output providing a command for a landing gear brake system, the landing gear brake control system being configured so that:
 i) when the brake command device input indicates the command level in the first sub-range of the brake command range, the landing gear brake system command output provides a command to the landing gear brake system to not provide a braking torque, and
 ii) when the brake command device input indicates the command level in the second sub-range of the brake command range, the landing gear brake system command output provides a command to the landing gear brake system to provide a braking torque.

14. The aircraft controller as claimed in claim 13, wherein the landing gear brake control system is configured so that the command of the braking torque increases as the command level within the second sub-range increases.

15. The aircraft controller as claimed in claim 13, wherein the controller is configured so that when the brake command device input indicates a command level in a further sub-range of the brake command range;

the landing gear drive system command output provides a command for the landing gear drive system to not provide a driving torque to taxi the aircraft, and the landing gear brake system command output of the landing gear brake control system provides a command to the landing gear brake system to provide the braking torque.

16. The aircraft controller as claimed in claim 11, wherein the controller is configured so that:

when the brake command device input indicates a command level in a low sub-range of the brake command range, the landing gear drive system command output provides a command for the landing gear drive system to provide a reduced driving torque than the driving torque to taxi the aircraft when the brake command device input indicates the command level in the first sub-range of the brake command range, and so that:

when the brake command device input indicates a command level in a medium sub-range of the brake command range, the landing gear drive system command output provides a command for the landing gear drive system to provide a reduced driving torque than the driving torque to taxi the aircraft when the brake command device input indicates the command level in the first sub-range of the brake command range, and the landing gear brake system command output of the landing gear brake control system provides a command to a landing gear brake system to provide a braking torque.

17. A landing gear drive and brake system associated with the aircraft controller of claim 11.

18. A landing gear drive system comprising:

a motor for providing a motor torque, a drive gear in drive connection with the motor, for providing a driving torque to a landing gear wheel, a controller for controlling a level of motor torque provided by the motor, the controller comprising:

a control input for providing an indication of a desired driving torque, and a reduction factor input for providing an indication of a reduction factor to be applied to the desired driving torque to a lower yet still positive driving torque, wherein the reduction factor is a level of reduction to be applied to take account of a brake effect to be applied, wherein the controller is configured to control the level of motor torque based on the control input and the reduction factor input.

19. A landing gear drive system as claimed in claim 18, wherein the brake effect may be only as a result of the reduction factor or may be a combination of the reduction factor and a braking torque applied to the landing gear wheel.

20. A landing gear drive system as claimed in claim 19, wherein the braking torque is applied to the landing gear wheel and the driving torque is applied to the landing gear wheel, being the same landing gear wheel.

\* \* \* \* \*